United States Patent [19]
Goldburt et al.

[11] Patent Number: 6,153,665
[45] Date of Patent: Nov. 28, 2000

[54] DOPED POLYMER SHEETING FOR COVERING HOTBEDS AND GREENHOUSES AND METHOD OF FABRICATION OF SUCH

[75] Inventors: E. Tim Goldburt, Chappaqua, N.Y.; Vladimir A. Bolchouchine, Fryazino, Russian Federation; Boris N. Levonovitch, Fryazino, Russian Federation; Naoum P. Sochtine, Fryazino, Russian Federation

[73] Assignee: Ram Phosphorix LLC, Ardsley, N.Y.

[21] Appl. No.: 09/178,542

[22] Filed: Oct. 26, 1998

[51] Int. Cl.$^7$ ...................................................... C08K 3/00
[52] U.S. Cl. ........................... 523/135; 523/137; 524/418
[58] Field of Search .................................... 523/135, 137; 524/418

[56] References Cited

U.S. PATENT DOCUMENTS

| | | | |
|---|---|---|---|
| 5,589,048 | 12/1996 | De Jaeger et al. | 204/489 |
| 5,919,552 | 7/1999 | Malhotra | 428/195 |

*Primary Examiner*—Edward J. Cain
*Attorney, Agent, or Firm*—I. Zborovsky

[57] ABSTRACT

A mechanically strong doped polymer sheeting—high-density polyethylene (HDPE) film—that provides excellent durability, high-maintenance and photo-transforming properties for covering hotbeds and greenhouses is comprised of: a light-transforming additive based on yttrium-europium oxysulfide; a light-stabilizing agent based on polyaminosuccinate; and a polymer resin used to form the high-density polyethylene 6-mil film. A preferred embodiment includes following composition and ratios: yttrium-europium oxysulfide content is 0.05–0.5% by weight; polyaminosuccinate content is 0.1–1% by weight; the ratio of yttrium-europium oxysulfide to polyaminosuccinate ranges from 0.5:1 to 1:2; and high-density polyethylene content is over 98.5% by weight according to above percentage of the additives. The doped polymer sheeting, HDPE film, for instance, can be fabricated efficiently and compactly packaged making it suitable for mass distribution. The film has photo-transforming properties that transform UV light into the wavelength of light that promotes photosynthesis in crop plants. This film, in turn, enhances crop growth and increases greenhouse internal ambient temperature leading to an extended growing season, higher crop quality and yield and frost protection—all that coupled with excellent durability and maintenance of the polymer sheeting. Finally, all of the doped polymer sheeting properties, as well as the sheeting itself, last over a period of two or more years.

17 Claims, 1 Drawing Sheet

DOPED POLYMER SHEETING FOR COVERING HOTBEDS AND GREENHOUSES AND METHOD OF FABRICATION OF SUCH

BACKGROUND OF THE INVENTION

This invention relates to the field of agricultural devices, and more particularly to polymeric or plastic materials used in temporary or permanent agricultural constructions, such as hotbeds and greenhouses. The agricultural plastic sheeting or films have specific technical properties designed for various growing conditions and are used for cladding greenhouses, hotbeds, tunnels, soil-mulching, etc. These plastic materials are made from high and low pressure polyethylene and polyvinyl chloride resins and manufactured as 20 to 300 $\mu$m thick films by numerous companies. Such films in quantities of thousands of tons are used to cover agricultural plants in trenches, to protect seeding in hotbeds, to cultivate crops and flowers in greenhouses and to perform experiments in greenhouses. Re-covering of said constructions with the film materials allows one to adapt temporary covered-soil constructions for different crops every season—if needed—thus controlling both gaseous exchange in plants and illumination conditions, with substantial economic savings. Furthermore, the polymeric covering material is three to four times cheaper than silicate glass.

One can incorporate into the polyethylene films UV or light stabilizers to expand the service life of these films [1]. One can also add anti-misting additives in order to prevent plant foliage and fruit scorching, which occurs from the condensation of water droplets. These additives also improve the quality of the crops. Other additives are designed to provide internal temperature variations in the greenhouses beneficial for a particular growth season effecting the yield of the crops.

In recent years, organic additives were used to yield colored films. The pigments and polychromatic additives based on these materials exhibit color when exposed to solar light or ultra-violet radiation. The rationale for incorporating these types of additives is that it allows a more efficient use of solar radiation since the coloration of the film corresponds to the photosynthetic active radiation (PAR)—the solar light fraction useful in producing plant growth.

It is well known that plants through their development stages react differently to the intensity and wavelength of the light. The band of 400 to 700 nm represents the PAR [2]. The absorption of the PAR radiation depends on absorbing species such as chlorophyll, carotene, etc., which have characteristic absorption wavelengths in that region. The plant's photosynthetic activity responds to specific wavelengths of the light [3]. In recent years, there has been particular interest in the active photosynthetic radiation over the range of 450 to 600 nm for the control of morphogenic, physiological and molecular development with regard to productivity of plant crops such as flowering, growth, yield and quality of produce [4–6]. Additional development of plastic materials using photosensitive additives was reported for the selective application of PAR [7], increasing the intensity of reproduction processes in green plants through generation of additional red-orange light.

The action mechanism of such polymeric materials with additives involves biophysical phenomenon of acceleration of photosynthesis in the chlorophyll pigment through increased absorption of red or orange light that results in additional absorption of carbonic acid from air, synthesis of carbohydrate, and release of oxygen. Red-orange light complementary to sunlight is excited in the additive under the action of ultraviolet rays (UV), a fraction of which in sunlight is 3–6%—it is believed that solar UV radiation is not absorbed by green plants. To transform unused UV solar energy into red-orange light useful for plants, authors of the work [7] suggested to add complex organic additives such as adonifen or europium phenanthrolinate, the photo-transforming materials, with a concentration of 0.05–1% in the film polymeric material. By using these photo-transforming additives, the yield of different crops was increased—through so-called photo-reproduction effect—as it was observed previously in temporary or permanent greenhouses when red light-emitting fluorescent lamps were used [7].

However, observations for a number of years showed numerous drawbacks of the first-generation polymeric photo-transforming material:

A photo-transforming effect lasted no more than 1–3 weeks;

Non-reproducibility of the photo-reproduction effect for plants of different kinds and groups, e.g. increase in lettuce crop was not repeated for tomato or carrot crops, etc.;

high cost of the film material because of extremely high cost of the organic photo-transforming additive;

low stability in different climactic zones and low mechanical strength of the polymeric material (trademark "Polysvetan"), resulting in fast degradation and destruction of the material during several weeks;

high toxicity and environmental hazard associated with using the polymeric material containing these additives.

The use of photo-transforming organic additives thus resulted in inferior mechanical and life properties of the plastic films with poor durability and maintenance due to the premature degradation [7].

Another noticeable effort in the field of photo-transforming additives by a group from the Applied Chemistry Center (ACC) at Saltitlo, Coahuila, Mexico, was granted a Mexican patent [8] for greenhouse film that makes the PAR more effective and thereby gives an increase in crop yield and quality—specifically, in lettuce. In a subsequent paper by Lozano et al [9], a 40% improvement yield of the lettuce crop was reported. Here, again, several shortcomings of the so-called polychromatic additive plastic films developed by the ACC group were reported [9]. In our opinion, the following shortcomings prevent their films from practical applications in the US:

The concentration of additives is too high, significantly increasing the costs.

The mechanical strength reported was reduced and in many cases was less than in the control film.

The films exhibited an early aging in less than a year of service.

Optical properties of these photo-transforming films were not studied therefore preventing optimization of the transmitted light spectrum.

Meanwhile, the essential drawbacks of the first-generation covering photo-transforming materials [7] stimulated the development of a new material in which the organic complex photo-transforming additive was fully or partially substituted by inorganic photo-transforming materials based on Oxysulfides or other oxyanionic materials [10]. In accordance with the Russian patent [10], 0.01–0.5 weight percent inorganic photo-transforming material was added to the plastic resin. After fabrication of sheeting, it was uniformly distributed in the plastic film. This sheeting generated additional red-orange light useful for growth of the vegetables, fruits, crops, flowers, tree cuttings and saplings, and other green plants. This plastic film—trade name "Redlight"— was widely used in Russia and contiguous countries from 1994 to 1998. At present, this plastic film represents a modern technological level of practical polymeric sheeting for agricultural applications mentioned above. The following positive features of "Redlight" polymer sheeting:

reasonably high brightness of red-orange emission, steady increase in yield of crops transplanted in covered soil, ecological safety and stability in different climactic zones, moderate increase in the cost of the polymer sheeting, do not eliminate a substantial drawback of the material: a significant rapid decrease of its physical and mechanical parameters within one summer season. For instance, the tensile strength of 6-mil—150 micron—thick sheeting decreased from 200 $kg/cm^2$ initially to 60 to 80 $kg/cm^2$ in two months only. Such lowering of the tensile strength resulted in fully destroyed, non-functional sheeting. One needs to re-cover greenhouses and hothouses with "Redlight" sheeting several times—up to three—during the agricultural season thereby increasing the costs to unpractical levels. Until now, numerous unsuccessful attempts to pinpoint the main reasons and eliminate the dramatic lowering of physical-mechanical properties of the covering film with inorganic photo-transforming additives were undertaken causing a decrease in the consumption of the "Redlight" sheeting. The issues of the film's durability and maintenance that translate into the film's lifetime and practical cost have to be qualitatively resolved in order to make the film's applications practical.

SUMMARY OF THE INVENTION

The primary object of the invention is to provide a new composition for polymer sheeting that will enhance the sheeting's physical and chemical properties, allowing for excellent durability and high-maintenance, as well as photo-transforming properties. The longevity of the photo-transforming properties allows the photo-reproduction effects leading to increased crop yields over a period of at least two years.

Another object of the invention is to incorporate this new composition in polymer sheeting so that the sheeting can be used over extended periods of time, and for at least two years, without having to replace the sheeting.

A further object of the invention is to provide a new composition for polymer sheeting with the photo-transforming properties of the sheeting lasting over at least two years.

Yet another object of the invention is to provide a new composition for polymer sheeting which accelerates ripening period of crops over at least two years.

Still yet another object of the invention is to provide a new composition for polymer sheeting that provides a faster crop harvest over at least two years.

Another object of the invention is to provide a new composition for polymer sheeting that extends the length of the growing season, allowing for at least two years seasons.

Another object of the invention is to provide a new composition for polymer sheeting that increases harvest by 50% for strawberries, cucumbers, red peppers and tomatoes over at least two years.

A further object of the invention is to provide a new composition for polymer sheeting that allows roses to bloom 30 days earlier over at least two years.

Yet another object of the invention is to provide a new composition for polymer sheeting that reduces crop sunburns over at least two years.

Still yet another object of the invention is to provide a new composition for polymer sheeting that increases vitamin content in fruits over at least two years.

Another object of the invention is to provide a new composition for polymer sheeting that increases temperature by 9 to 15 degrees Fahrenheit over at least two years.

Another object of the invention is to provide a new composition for polymer sheeting that provides frost protection to 18 degrees Fahrenheit over at least two years.

A further object of the invention is to provide a new composition for polymer sheeting fabrication that will not have a significant effect on the cost of manufacturing the polyethylene film.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, a doped polymer sheeting for covering hotbeds and greenhouses comprising a photo-transforming additive based on yttrium-europium oxysulfide, a light-stabilizing agent based on polyaminosuccinate, and a polymer resin used to form high-density polyethylene film.

In accordance with another embodiment of the invention, a method of preparation of doped polymer sheeting comprising the steps of: forming a master batch of yttrium-europium oxysulfide, polyaminosuccinate, and polyethylene with the concentration of additives 50–100 times higher than in the final film, and diluting this composition in polyethylene at the temperatures of 180–220 degrees C., concurrently moving a melted polyethylene within the feeding rate range of 0.5–30 kg/hr.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Figure 1:
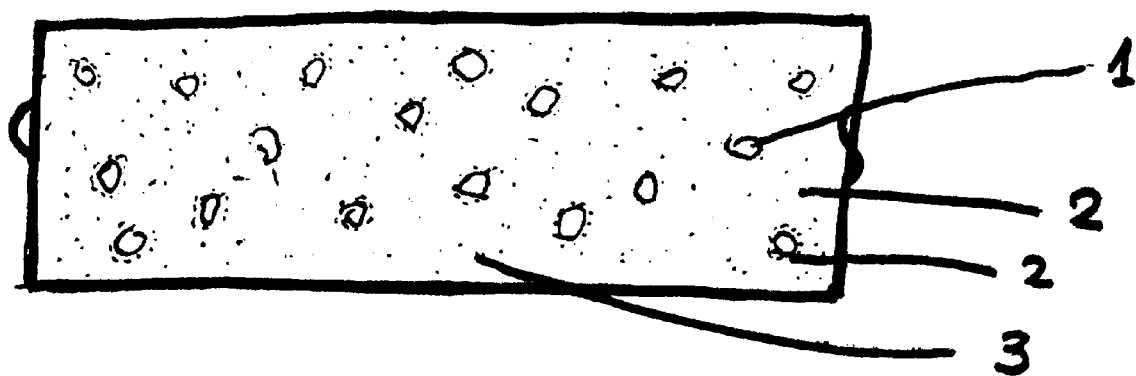
FIG. 1 is a cross-sectional view of the polymer film. Item 1 shows a photo-transforming additive particle. The particle size is varied from 4 to 20 microns. Item 2 shows a light-stabilizing additive particle and molecules. It is to be understood that most of the light stabilizing additive is present as molecules, not particles, in the polymer sheeting. Item 3 shows bulk HDPE film. The thickness of the film is, but not limited to, approximately 6 mil (150 μm).

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

In accordance with the present invention, FIG. 1 shows a perspective view of the cross-section of the polymer sheeting. The significant elements in the sheeting are the photo-transforming particle, item 1, and the light-stabilizing additive, item 2. The bulk of the high-density polyethylene is also shown, item 3.

The polyethylene, which represents more than 98.5% of the polymer sheeting mass, is doped with a powder composition of inorganic photo-transforming additive (PTA) and light-stabilizing additive (LSA) powders. This composition is homogenized by thorough blending of yttrium-europium oxysulfide powder, comprised of 4 to 20 μm particles, and quaternary aminosuccinate powders. The result of the thorough mixing is illustrated in FIG. 1 where the surface of the photo-transforming grains is covered with LSA material—quaternary aminosuccinates—absorbed or fixed to the surface by physical absorption forces. When the polymer mass of the high-density polyethylene is melted and reaches appropriate fluidity, the homogenized composition of PTA and LSA materials is fed through a dosing mechanism into the melt where it is spread uniformly in the polyethylene by both stirring and Stokes precipitation. It is likely that the physically absorbed quaternary aminosuccinate, which is weakly coupled with the surface of the inorganic PTA—yttrium-europium oxysulfide—is dissolved in the melted polyethylene. However, a part of the LSA material that is chemically absorbed remains on the surface of the PTA grains as illustrated in FIG. 1. The chemical absorption leads to effective micro-encapsulation of the PTA particles. This sharply improves uniformity of PTA dispersion in the bulk of the high-density polyethylene film fabricated from the above melt. In addition, thorough PTA dispersion improves the photo-transforming properties of the resultant polymer sheeting.

The mechanism proposed here is not likely to be complete and comprehensive. However, it allows one to explain an observed highly-improved—synergetic—effect of the polymer film's physical-mechanical strength with different concentrations of additives upon continuous UV irradiation of the polymeric material (see table 1). A 200 W xenon lamp was used to simulate the artificial UV irradiation and accelerate the aging test. The maximum irradiation time was 48 hours.

TABLE 1

The tensile strength behavior of the five typical film composition upon UV irradiation.

| Composition of polymeric cover | Concentration, Mass % | Tensile strength, kg/cm² 0 to 14 hours | Tensile strength, kg/cm² 28 hours | Tensile strength, kg/cm² 48 hours |
|---|---|---|---|---|
| HDPE + LSA | 99.8 0.2 | 200 | 185 | 154 |
| HDPE + PTA | 99.9 0.1 | 150 | 75 | 40 |
| HDPE + LSA + PTA | 99.85 0.1 0.05 | 210 | 195 | 190 |
| HDPE + LSA + PTA | 99.75 0.1 0.15 | 222 | 202 | 195 |
| HDPE + LSA + PTA | 99.7 0.2 0.1 | 225 | 214 | 205 |

Table 1 lists results of the five experiments with different concentrations of additives and measured tensile strength upon exposure to the UV xenon lamp for 14, 28 and 48 hours. The first experiment was performed on the polymer film with light-stabilizing additive only. It shows a significant decrease in the tensile strength upon 48 hours exposure. The tensile strength drops from 200 kg/cm² to 154 kg/cm². In the second experiment the additive used was the photo-transforming additive. The tensile strength dropped from 150 to 40 kg/cm². This result is expected because no light-stabilizing agent was used. The third, fourth and fifth experiments show tensile strength behavior as the concentration and ratio of the two additives is varied. The best result was achieved in the fifth experiment where the tensile strength decreased only slightly after a significant exposure to UV. At the same time a significant increase in the tensile strength of the polymer film is measured as result of the synergetic behavior described above. The initial tensile strength is 225 kg/cm². It is this tensile strength result that provides the most important claim of durability and maintenance of the polymer sheeting with an appropriate PTA-LSA composition.

In terms of the method of fabrication of the HDPE film, the authors used the following approach. First, mechanical mixing of two-part light-stabilizing additive with a HDPE resin was carried out using a typical extruder provided with two schneck dose batchers and one melting chamber. The melted HDPE (PEVD 153, 158 03–20, in Russian notation), at a pressure of 0.2–0.5 atmosphere (1 atmosphere~14 psi), passes under two dose batchers, one of which is filled with the composition of the inorganic PTA material thoroughly mixed with the organic LSA material. Once it is added, the composition is uniformly distributed in the bulk of the melted polyethylene resin. Controlling mass and relative velocity of extrusion of the melted polyethylene in relation to rate of addition of PTA in a ratio of 20 kg of melt per 300 g of PTA/LSA, one can distribute these additives in the bulk of polyethylene resin with a reasonable uniformity. Thereafter, a resulting master batch, which comprises of standard-size doped-resin granules obtained after granulating process, can be used in production of PTA/LSA doped polymeric sheeting or glazing.

A second, more complicated embodiment of the invention lies in preliminary wet mixing of the two additives (organic and inorganic) and obtaining of their homogeneous blend. Alcohol compositions on the basis of a primary standard composition added with dimethyl formamide were used as a solvent—diluent, with the concentration of quaternary aminosuccinate being in the range 5–10%. The composition was prepared in a set up with a reverse condenser where the mass heated up to 90–100 C. was continuously stirred. Then, the prepared composition was extruded into a chamber of the main mixer through a slit batcher at a rate of 1.5–2 kg/min and a schneck screw rotation speed of 40 to 80 rpm. The obtained mass was extruded into a granulator where the main component of an intermediate process—the master batch with the concentration of the additives up to 5%—was formed. Measuring the luminance intensity controlled the content of the inorganic additive in this master batch. The luminance intensity was correlated with the concentration of the inorganic PTA luminescent materials. The "wet" mixing process exhibited uniformity of distribution of the inorganic PTA material both in the first (50 kg), and in the final fractions of the master batch at a level of plus or minus five percent. The final process of preparation of the polymer sheeting material, with the inorganic and organic additives added within the master batch, was the dry mixing of the master batch and HDPE resin in ratio of 1:45–1:55, melting the mass obtained, thorough stirring in the hot schneck batcher, and extruding at a draw-plate temperature in the range 210–220 C. with a mass enter rate of 0.8–1 kg/min and a pressure of hot air of 0.8–1 atmosphere in the sleeve.

Photo-transforming properties of the polymeric film were tested during the spring-summer season 1997 by the Botanic Garden of the Lomonosov Moscow State University, Moscow, and by private agricultural companies. The germination and yield of different crops were significantly increased by 20 to 40%. Both the agricultural botanists and horticulturists found that the new film composition has advantages in terms of mechanical strength and water resistance. Unlike the "Redlight" film, this film is rugged and will maintain its photo-transforming properties over a period of at least two years.

Thus, the composition of the polymer sheeting allows it to be used for at least two years, without having to replace the sheeting. The sheeting, therefore, has excellent durability and high-maintenance qualities, as well as long-lasting photo-transforming properties. The use of this sheeting also accelerates the ripening period, provides for a faster crop harvest and extends the growing seasons by converting the harmful UV-light into light that enhances the crop growth, yield and quality. The harvest for strawberries, cucumbers, red peppers and tomatoes is increased by at least 50%, while the vitamin content in fruits is increased and roses bloom thirty days earlier. The composition in the film allows also for a reduction in crop sunburns, while increasing temperature by nine to fifteen degrees Fahrenheit, and it provides frost protection to eighteen degrees Fahrenheit.

Yttrium-europium, polyaminosuccinate and the high density polyethylene can be substituted by, in respective order, other photo-transforming materials or phosphors, other light stabilizing materials and by low-density polyethylene, polyvinyl chloride or other inexpensive polymer precursor, resulting in synergy with the other two components, while yielding a mechanically strong polymer sheeting with the same excellent durability and maintenance, as well as photo-transforming properties. Finally, the said film is ecologically safe, non-toxic and non-flammable.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

References

1. Allingham Yael, Plastic Sheeting for Greenhouse and the Like, U.S. Pat. No. 4,895,904 (1990).
2. Gates, D. M., Biophysical Ecology, Springer Verlag, New York, Inc. New York, (1980).
3. Inada K., Funakoshi, M., Aoki M., Fukui M. and Katsura N., Effect of Spectra Quality of Composite Lights on Photosynthesis of Crop Plants, Japan Jour Crop Sci 49, 34–41, (1960).
4. Yamaya H. K., Global Fresh Cut Flower Production. International Trade and worldwide Consumer Demands: "An Overview and Prospective Toward the 21$^{st}$ Century", Exposicion Internacional Floricola, Toluca Edo Mexico, Jun. 13–15, p. 12 (1991).
5. Almanza R., Solar Radiation and its Utilization in Natural Resources and Development in Arid Regions, E. Campus-Lopez and R. J. Anderson, Westview press, 231–243 (1983).
6. Smith, H. and Holmes M. G.—Techniques in photomorphogenesis, Academic Press, p. 308 (1984).
7. Kusnetsov S. Y., Lepyanin G.—Polisveton—High Performance Material for Cladding Greenhouses, Plasticulture No. 83, 3, pg. 13–20 (1989).
8. Lozano M. J., Gonzalez E. A. and Gonzalez M. C., Formulacion mejorada de Pelicula Plastica Cromatica para Cubierta de invernadero, Mexican Patent filed No 9600095 (1996).
9. Lozano M. J., Gonzalez M. C. and Gonzalez E. A., Growing Lettuces in Greenhouses Clad in Polychromatic Films, Plasti-culture No. 91, pg. 1–8 (1997).
10. Schelokov R. N., Sotchine N. P., Zorina L. N., Bratkova L. R., Polymer Composition for Greenhouses and Hotbeds, Russian Patent #2,059,999 (1996).

What is claimed is:

1. Doped polymer sheeting for covering hotbeds and greenhouses comprising:

a photo-transforming additive based on yttrium-europium oxysulfide;

a light-stabilizing agent based on polyaminosuccinate;

a polymer resin used to form high-density polyethylene film.

2. A doped polymer sheeting as claimed in claim 1 wherein said photo-transforming additive—yttrium-europium oxysulfide—is 0.05–0.5% by weight.

3. A doped polymer sheeting as claimed in claim 1 wherein said yttrium-europium oxysulfide has particle size ranging from 4 to 20 microns and the thickness of the sheeting is 1 to 10 mil.

4. A doped polymer sheeting as claimed in claim 1 wherein said light-stabilizing agent—polyaminosuccinate—is 0.1–1% by weight.

5. A doped polymer sheeting as claimed in claim 1 wherein the ratio of the photo-transforming additive—yttrium-europium oxysulfide—to the light stabilizing agent—polyaminosuccinate—is in the range of 0.5:1 to 2:1.

6. A doped polymer sheeting as claimed in claim 1 wherein said polymer resin used to form high-density polyethylene film is over 98.5% by weight with relation to the other two said components—the photo-transforming additive, yttrium-europium oxysulfide, and the light-stabilizing agent, polyaminosuccinate.

7. A doped polymer sheeting as claimed in claim 1 whose composition, as claimed in claims 2 through 6, will not have a significant effect on the cost of manufacturing the polyethylene film.

8. A doped polymer sheeting as claimed in claim 1 that can be used for at least two years without having to replace the sheeting, thus having excellent durability and high-maintenance qualities, as well as long-lasting photo-transforming properties.

9. A doped polymer sheeting as claimed in claim 8 that accelerates the ripening period, provides for a faster crop harvest, and extends the growing season allowing for at least two longer growing seasons.

10. A doped polymer sheeting as claimed in claim 8 that increases harvest by 50% for strawberries, cucumbers, red peppers and tomatoes, increases vitamin content in fruits and allows roses to bloom 30 days earlier.

11. A doped polymer sheeting as claimed in claim 8 that reduces crop sunburns, while increasing temperature by 9 to 15 degrees Fahrenheit, and providing frost protection to 18 degrees Fahrenheit.

12. A doped polymer sheeting as claimed in claim 1 wherein said yttrium-europium oxysulfide can be substituted by other phosphors or photo-transforming materials that would result in synergy with the other components—light stabilizing materials and polymer resin—yielding, as claimed in claim 8, a mechanically strong polymer sheeting with excellent durability and maintenance, as well as photo-transforming properties.

13. A doped polymer sheeting as claimed in claim 1 wherein said polyaminosuccinate can be substituted by other light stabilizing materials and would result in synergy with the other components—photo-transforming materials and polymer resin—yielding, as claimed in claim 8, a mechanically strong polymer sheeting with excellent durability and maintenance, as well as photo-transforming properties.

14. A doped polymer sheeting as claimed in claim 1 wherein said high-density polyethylene can be substituted by low-density polyethylene, polyvinyl chloride or other inexpensive precursor resulting in synergy with the other components—photo-transforming materials and light-stabilizing materials—yielding, as claimed in claim 8, mechanically strong polymer sheeting with excellent durability and maintenance, as well as photo-transforming properties.

15. A doped polymer sheeting as claimed in claim 8 that are ecologically safe, non-toxic and non-flammable.

16. Method of fabrication of said doped polymer sheeting, as defined in claim 1, comprising the steps of:
   first, forming a master batch of yttrium-europium oxysulfide, polyaminosuccinate, and polyethylene with the concentration of additives 50–100 times higher than in the final film; second, diluting this composition in polyethylene at the temperatures of 180–220 degrees C., concurrently moving a melted polyethylene within the rate range of 0.5–30 kg/hr.

17. Method of fabrication of said doped polymer sheeting, as claimed in claim 16, where it is one out of two or more layers in a laminated polymer or inorganic film.

* * * * *